United States Patent
Somani et al.

(10) Patent No.: US 11,296,602 B2
(45) Date of Patent: Apr. 5, 2022

(54) DUAL OUTPUT CONFIGURABLE POLARITY UNIVERSAL BUCK-BOOST TOPOLOGY AND SWITCHING SEQUENCE

(71) Applicant: Hamilton Sundstrand Corporation, Charlotte, NC (US)

(72) Inventors: Vaibhav Kumar Somani, Bangalore (IN); Raviprakash Yadav, Bengaluru (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/930,979

(22) Filed: Jul. 16, 2020

(65) Prior Publication Data
US 2021/0391794 A1    Dec. 16, 2021

(30) Foreign Application Priority Data
May 11, 2020  (IN) .............................. 202041019745

(51) Int. Cl.
*H02M 3/158* (2006.01)
*H02M 1/088* (2006.01)
*H02M 1/00* (2006.01)

(52) U.S. Cl.
CPC ......... *H02M 3/1582* (2013.01); *H02M 1/088* (2013.01); *H02M 1/009* (2021.05)

(58) Field of Classification Search
CPC .......................................... H02M 3/155–1588
See application file for complete search history.

(56) References Cited

U.S. PATENT DOCUMENTS

| | | | |
|---|---|---|---|
| 9,088,211 B2 | 7/2015 | Ivanov et al. | |
| 9,136,756 B2 | 9/2015 | Liu | |
| 9,577,587 B2* | 2/2017 | Maru | H02M 7/00 |
| 10,014,777 B1 | 7/2018 | Shumkov et al. | |
| 10,381,953 B2 | 8/2019 | Ho et al. | |
| 2002/0093315 A1* | 7/2002 | Sluijs | H02M 3/158 |
| | | | 323/267 |
| 2010/0039080 A1 | 2/2010 | Schoenbauer et al. | |
| 2010/0194359 A1* | 8/2010 | Notman | H02M 3/1588 |
| | | | 323/267 |

* cited by examiner

*Primary Examiner* — Peter M Novak
(74) *Attorney, Agent, or Firm* — Locke Lord LLP; Joshua L. Jones; Scott D. Wofsy

(57) ABSTRACT

A single input dual output buck-boost power conversion system includes a voltage source input for connecting a voltage source for power conversion. A plurality of switches electrically connect to the voltage source input, wherein each switch is connected to a controller configured for pulse width modulation (PWM) control of the switches. A first voltage output is configured to connect to a first load to power the first load with converted power from the voltage source input. A second voltage output is configured to connect to a second load to power the second load with converted power from the voltage source input, wherein the controller is configured to provide positive voltage or negative voltage to each of the first and second voltage outputs, as needed for any of four combinations of polarity among the first and second voltage outputs including positive-positive, positive-negative, negative-positive, and negative-negative.

9 Claims, 3 Drawing Sheets

| Modes | Mode 1 | | | Mode 2 | | | Mode 3 | | | Mode 4 | | |
|---|---|---|---|---|---|---|---|---|---|---|---|---|
| PWMs | T on | T off1 | T off2 | T on | T off1 | T off2 | T on | T off1 | T off2 | T on | T off1 | T off2 |
| PWM1.S1 | 1 | 0 | 0 | 1 | 0 | 0 | 1 | 0 | 0 | 1 | 0 | 0 |
| PWM2.S2 | 0 | 0 | 1 | 0 | 0 | 1 | 0 | 1 | 1 | 0 | 0 | 0 |
| PWM3.S3 | 1 | 1 | 0 | 1 | 1 | 0 | 1 | 0 | 0 | 1 | 1 | 1 |
| PWM4.S4 | 0 | 0 | 1 | 0 | 0 | 0 | 0 | 1 | 0 | 0 | 0 | 0 |
| PWM5.S5 | 0 | 1 | 0 | 0 | 0 | 0 | 0 | 0 | 0 | 0 | 0 | 0 |
| PWM6.S6 | 0 | 0 | 0 | 0 | 0 | 1 | 0 | 0 | 1 | 0 | 0 | 0 |
| PWM7.S7 | 0 | 0 | 0 | 0 | 1 | 0 | 0 | 0 | 0 | 0 | 1 | 0 |
| | Positive.Negative | | | Negative.Positive | | | Positive.Positive | | | Negative.Negative | | |

*Fig. 2*

| Modes | Mode 5 | | Mode 6 | | Mode 7 | | Mode 8 | |
|---|---|---|---|---|---|---|---|---|
| PWMs | T on | T off | T on | T off | T on | T off | T on | T off |
| PWM1.S1 | 1 | 0 | 1 | 0 | 1 | 0 | 1 | 0 |
| PWM2.S2 | 0 | 1 | 0 | 0 | 0 | 1 | 0 | 0 |
| PWM3.S3 | 1 | 0 | 1 | 1 | 1 | 0 | 1 | 1 |
| PWM4.S4 | 0 | 1 | 0 | 0 | 0 | 0 | 0 | 0 |
| PWM5.S5 | 0 | 0 | 0 | 0 | 0 | 1 | 0 | 1 |
| PWM6.S6 | 0 | 0 | 0 | 0 | 0 | 0 | 0 | 0 |
| PWM7.S7 | 0 | 0 | 0 | 1 | 0 | 0 | 0 | 0 |

*Fig. 3*

DUAL OUTPUT CONFIGURABLE POLARITY UNIVERSAL BUCK-BOOST TOPOLOGY AND SWITCHING SEQUENCE

CROSS-REFERENCE TO RELATED APPLICATIONS

This application claims priority to Indian Application No. 202041019745 filed May 11, 2020 the entire contents of which are incorporated by reference herein.

BACKGROUND

1. Field

The present disclosure relates to power conversion, and more particularly to single input dual output buck-boost power supply topologies.

2. Description of Related Art

In modular power supply, there is a need of power conversion topologies with any polarity combination of dual output for varying input voltage ranges. Typically, single inductor dual output topologies are in practice for either dual positive or dual bipolar outputs. But the aforementioned topologies cannot be configured for all four possible polarity combinations in the dual outputs, i.e., positive-positive, negative-positive, positive-negative, and negative-negative.

The conventional techniques have been considered satisfactory for their intended purpose. However, there is an ever present need for improved systems and methods for power supply. This disclosure provides a solution for this need.

SUMMARY

A single input dual output buck-boost power conversion system includes a voltage source input for connecting a voltage source for power conversion. A plurality of switches electrically connect to the voltage source input, wherein each switch is connected to a controller configured for pulse width modulation (PWM) control of the switches. A first voltage output is configured to connect to a first load to power the first load with converted power from the voltage source input. A second voltage output is configured to connect to a second load to power the second load with converted power from the voltage source input, wherein the controller is configured to provide positive voltage or negative voltage to each of the first and second voltage outputs, as needed for any of four combinations of polarity among the first and second voltage outputs including positive-positive, positive-negative, negative-positive, and negative-negative.

A first line can run from a positive node of the voltage source input to a first node of the first voltage output. A second line can run from a negative node of the voltage source input to a second node of the first voltage output. The first voltage output can be configured to power a first load connected between the first and second nodes of the first voltage output. A third line can connect between the first line and a first node of the second voltage output, wherein the second voltage output includes a second node and is configured to power a second load connected between the first and second nodes of the second voltage output.

An inductor can be connected in series along the first line. A capacitor can connect between the first and second lines. A second capacitor can be connected between the first and second nodes of the second voltage output.

The plurality of switches can include: a first switch, connected in series along the first line between the voltage source input and the inductor; a second switch, connecting between the first line and the second line; a third switch, connecting between the first line and the second line; a fourth switch, connected in series along the first line between the first node of the first voltage output and the third switch; a fifth switch connected in the third line between the first line and the first node of the second voltage output; a sixth switch, connecting between the first line and the first node of the second voltage output; and a seventh switch, connected in series along a fourth line that is in parallel with the first line. The second switch connects to the first line between the first switch and the inductor. The third switch connects to the first line at a node between the inductor and the first node of the first voltage output. The fifth switch connects to the first line at the node between the first switch and the inductor. The sixth switch connects to the first line between the inductor and the third switch. The fourth line connects to the first line at a node between the first switch and the inductor, and at the first node of the first voltage output.

In a first mode the first voltage output can have the same polarity as the voltage source input and the second voltage output as a polarity opposite that of the voltage source input. The controller can include machine readable instructions configured to cause the controller in a first mode with non-inverting output for the first voltage output and inverting output for the second voltage output to cycle the switches in order between a first state, a second state, and a third state. In the first state the first switch is on, the second switch is off, the third switch is on, the fourth switch is off, the fifth switch is off, the sixth switch is off, and the seventh switch is off. In the second state the first switch is off, the second switch is off, the third switch is on, the fourth switch is off, the fifth switch is on, the sixth switch is off, and the seventh switch is off. In the third state, the first switch is off, the second switch is on, the third switch is off, the fourth switch is on, the fifth switch is off, the sixth switch is off, and the seventh switch is off.

In a second mode the first voltage output can have a polarity opposite that of the voltage source input and the second voltage output has the same polarity as the first voltage source input. The controller can include machine readable instructions configured to cause the controller in the second mode with inverting output for the first voltage output and non-inverting output for the second voltage output to cycle the switches in order between a first state, a second state, and a third state. In the first state the first switch is on, the second switch is off, the third switch is on, the fourth switch is off, the fifth switch is off, the sixth switch is off, and the seventh switch is off. In the second state the first switch is off, the second switch is off, the third switch is on, the fourth switch is off, the fifth switch is off, the sixth switch is off, and the seventh switch is on. In the third state, the first switch is off, the second switch is on, the third switch is off, the fourth switch is off, the fifth switch is off, the sixth switch is on, and the seventh switch is off.

In a third mode the first and second voltage outputs can have the same polarity as the voltage source input. The controller can include machine readable instructions configured to cause the controller in the third mode with non-inverting output for the first voltage output and non-inverting output for the second voltage output to cycle the switches in order between a first state, a second state, and a third state. In the first state the first switch is on, the second switch is off, the third switch is on, the fourth switch is off, the fifth switch is off, the sixth switch is off, and the seventh switch is off. In the second state the first switch is off, the second switch is on, the third switch is off, the fourth switch is on, the fifth switch is off, the sixth switch is off, and the seventh switch is off. In the third state, the first switch is off, the second switch is on, the third switch is off, the fourth switch is off, the fifth switch is off, the sixth switch is on, and the seventh switch is off.

In a fourth mode the first and second voltage outputs can have a polarity opposite that of the voltage source input. The controller can include machine readable instructions configured to cause the controller in the fourth mode with inverting output for the first voltage output and inverting output for the second voltage output to cycle the switches in order between a first state, a second state, and a third state. In the first state the first switch is on, the second switch is off, the third switch is on, the fourth switch is off, the fifth switch is off, the sixth switch is off, and the seventh switch is off. In the second state the first switch is off, the second switch is off, the third switch is on, the fourth switch is off, the fifth switch is off, the sixth switch is off, and the seventh switch is on. In the third state, the first switch is off, the second switch is off, the third switch is on, the fourth switch is off, the fifth switch is on, the sixth switch is off, and the seventh switch is off.

The controller and switches can be configured for pulse width modulation (PWM) control of the switches from state to state. The controller can be configured to receive input and to switch between the first, second, third, and fourth modes based on input. A method includes switching a single buck-boost circuit with a single voltage source input between two modes from among the four modes described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 2 is a table showing the switching sequences for the different modes of operation of the controller of FIG. 1; and FIG. 3 is a table showing the switching states for four additional non-inverting and inverting modes for the controller of FIG. 1.

DETAILED DESCRIPTION OF THE PREFERRED EMBODIMENTS

Figure 1:
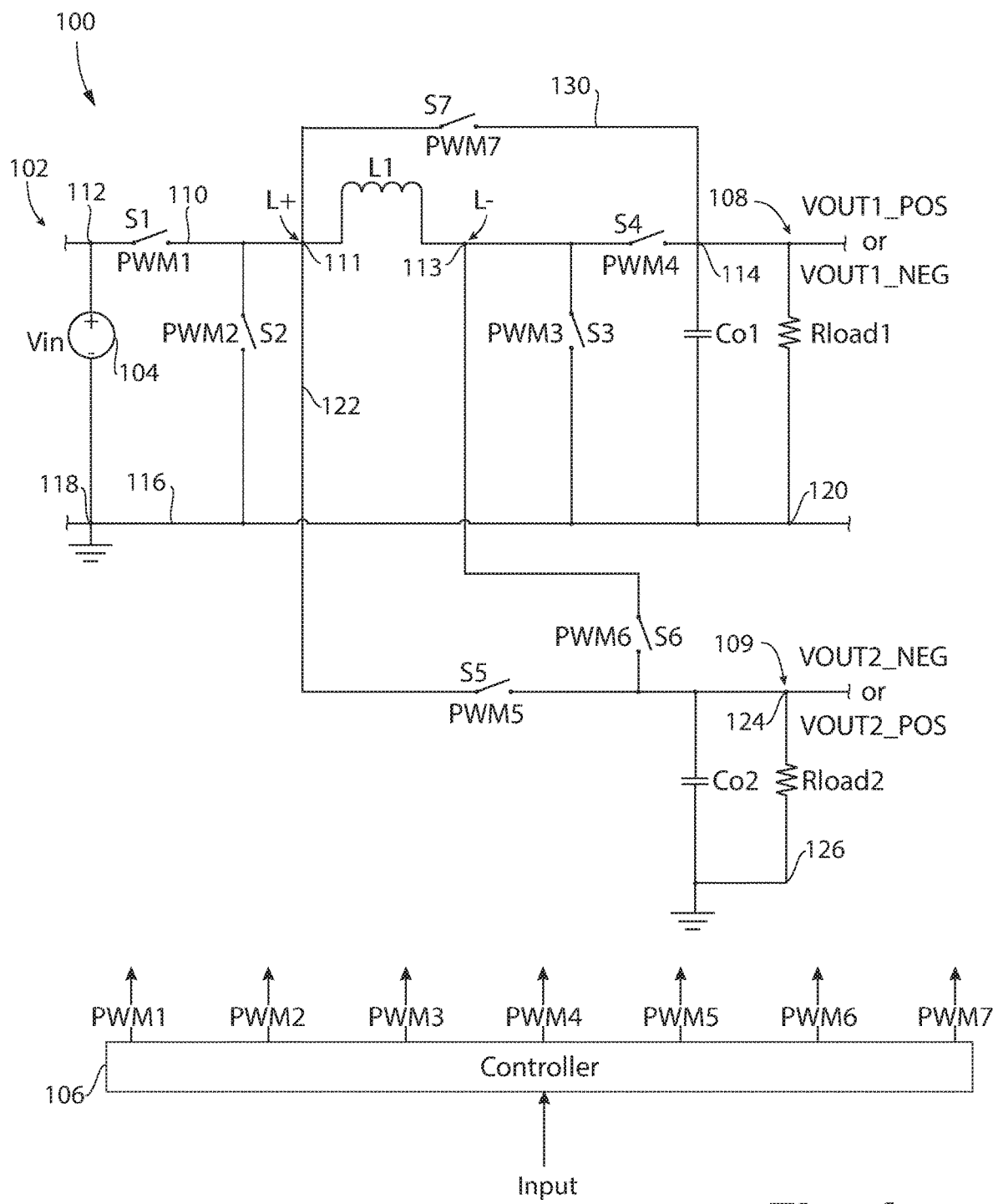
FIG. 1 is a schematic view of an embodiment of a system constructed in accordance with the present disclosure, showing the switch topology and controller.

Reference will now be made to the drawings wherein like reference numerals identify similar structural features or aspects of the subject disclosure. For purposes of explanation and illustration, and not limitation, a partial view of an embodiment of a single input dual output buck-boost power converting system in accordance with the disclosure is shown in FIG. 1 and is designated generally by reference character 100. Other aspects are shown in FIGS. 2-3. The systems and methods described herein can be used to provide positive voltage or negative voltage to each of first and second voltage outputs, as needed for any of four combinations of polarity among the first and second voltage outputs including positive-positive, positive-negative, negative-positive, and negative-negative.

The dual output buck-boost power converting system 100 includes a voltage source input 102 for connecting a voltage source 104 for power conversion. A plurality of switches S1, S2, S3, S4, S5, S6, S7 are electrically connected to the voltage source input 102. Each switch S1, S2, S3, S4, S5, S6, S7 is connected to a controller 106 configured for pulse width modulation (PWM) control of the switches S1, S2, S3, S4, S5, S6, S7. A first voltage output 108 is configured to connect to a first load $R_{laod1}$ to power the first load $R_{laod1}$ with converted power from the voltage source input 102. A second voltage output 109 is configured to connect to a second load $R_{laod2}$ to power the second load $R_{laod2}$ with converted power from the voltage source input 102. The controller 106 is configured to set positive voltage or negative voltage to each of the first and second voltage outputs 108, 109, as needed for any of four combinations of polarity among the first and second voltage outputs 108, 109 including positive-positive, positive-negative, negative-positive, and negative-negative.

A first line 110 runs from a positive node 112 of the voltage source input 102 to a first node 114 of the first voltage output 108. A second line (or ground) 116 runs from a negative node 118 (or ground) of the voltage source input 102 to a second node 120 (or ground) of the first voltage output 108. The first voltage output 108 is configured to power the first load $R_{laod1}$ connected between the first and second nodes 114, 120 of the first voltage output 108. A third line 122 connects between the first line 110 and a first node 124 of the second voltage output 109. The second voltage output 109 includes a second node 126 and is configured to power the second load $R_{laod2}$ connected between the first and second nodes 124, 126 of the second voltage output 109. The second node 126 of the second voltage output 109 also connects to the second line 116 due to common ground.

An inductor L1 is connected in series along the first line 110. A first capacitor Co1 connects between the first and second lines 110, 116. A second capacitor Co2 is connected between the first and second nodes 124, 126 of the second voltage output 109. The second capacitor Co2 connects between the third line 122 and the second line 116 or ground. The first switch S1 is connected in series along the first line 110 at a first node 111 of the inductor L1 between the voltage source input 102 and the inductor L1. The second switch S2 connects between the first line 110 and the second line 116, wherein the second switch S2 connects to the first line 110 at the node 111 between the first switch S1 and the inductor L1. The third switch S3 connects between the first line 110 and the second line 116, wherein the third switch S3 connects to the first line 110 at a node 113 between the inductor L1 and the first node 114 of the switch S4. The fourth switch S4 connects in series along the first line 110 between the first node 114 of the first voltage output 108 and the third switch S3. The fifth switch S5 is connected in the third line 122 between the node 111 of the first line 110 and the first node 124 of the second voltage output 109. The sixth switch S6 connects between the first line 110 and the first node 124 of the second voltage output 109 of line 122, wherein the sixth switch S6 connects to the first line 110 at node 113 between the inductor L1 and the third switch S3.

The seventh switch S7 is connected in series along a fourth line 130 that is in parallel with the first line 110, wherein the fourth line 130 connects to the first line 110 at the node 111 between the second switch S2 and the inductor L1, and at the first node 114 of the first voltage output 108.

With reference now to FIG. 2, the tabular value '1' stands for "on or close" and '0' stands for "off or open." In a first mode of system 100 (shown in FIG. 1), the first voltage output 108 has the same polarity as the voltage source input 102 (positive or non-inverting) and the second voltage output 109 as a polarity opposite that of the voltage source input 102 (negative or inverting). The controller 106 includes machine readable instructions configured to cause the controller 106 in the first mode (Mode 1 in FIG. 2) to cycle the switches S1-S7 in order between a first state Ton, a second state Toff1, and a third state Toff2. In the first state Ton, the first switch S1 is on (or closed), the second switch S2 is off (or open), the third switch S3 is on, the fourth switch S4 is off, the fifth switch S5 is off, the sixth switch S6 is off, and the seventh switch S7 is off. In the second state Toff1, the first switch S1 is off, the second switch S2 is off, the third switch S3 is on, the fourth switch S4 is off, the fifth switch S5 is on, the sixth switch S6 is off, and the seventh switch S7 is off. In the third state, the first switch S1 is off, the second switch S2 is on, the third switch S3 is off, the fourth switch S4 is on, the fifth switch S5 is off, the sixth switch S6 is off, and the seventh switch S7 is off.

In a second mode, the first voltage 108 (shown in FIG. 1) output has a polarity opposite that of the voltage source input 102 (negative or inverting) and the second voltage output 109 has the same polarity as the first voltage source input 102 (positive or non-inverting). The controller 106 includes machine readable instructions configured to cause the controller 106 in the second mode (Mode 2 in FIG. 2) to cycle the switches S1-S7 in order between a first state Ton, a second state Toff1, and a third state Toff2. In the first state Ton, the first switch S1 is on, the second switch S2 is off, the third switch S3 is on, the fourth switch S4 is off, the fifth switch S5 is off, the sixth switch S6 is off, and the seventh switch S7 is off. In the second state Toff1, the first switch S1 is off, the second switch S2 is off, the third switch S3 is on, the fourth switch S4 is off, the fifth switch S5 is off, the sixth switch S6 is off, and the seventh switch S7 is on. In the third state Toff2, the first switch S1 is off, the second switch S2 is on, the third switch S3 is off, the fourth switch S4 is off, the fifth switch S5 is off, the sixth switch S6 is on, and the seventh switch S7 is off.

In a third mode (Mode 3 in FIG. 2) the first and second voltage outputs 108, 109 (shown in FIG. 1) have the same polarity as the voltage source input 102 (both positive or non-inverting). The controller 106 includes machine readable instructions configured to cause the controller 106 in the third mode (Mode 3 in FIG. 2) to cycle the switches S1-S7 in order between a first state Ton, a second state Toff1, and a third state Toff2. In the first state Ton the first switch S1 is on, the second switch S2 is off, the third switch S3 is on, the fourth switch S4 is off, the fifth switch S5 is off, the sixth switch S6 is off, and the seventh switch S7 is off. In the second state Toff1 the first switch S1 is off, the second switch S2 is on, the third switch S3 is off, the fourth switch S4 is on, the fifth switch S5 is off, the sixth switch S6 is off, and the seventh switch S7 is off. In the third state Toff2 the first switch S1 is off, the second switch S2 is on, the third switch S3 is off, the fourth switch S4 is off, the fifth switch S5 is off, the sixth switch S6 is on, and the seventh switch S7 is off.

In a fourth mode (Mode 4 in FIG. 2) the first and second voltage outputs 108, 109 (shown in FIG. 1) have a polarity opposite that of the voltage source input 102 (both inverting). The controller 106 includes machine readable instructions configured to cause the controller 106 in the fourth mode (Mode 4 in FIG. 2) to cycle the switches S1-S7 in order between a first state Ton, a second state Toff1, and a third state Toff2. In the first state Ton the first switch S1 is on, the second switch S2 is off, the third switch S3 is on, the fourth switch S4 is off, the fifth switch S5 is off, the sixth switch S6 is off, and the seventh switch S7 is off. In the second state Toff1 the first switch S1 is off, the second switch S2 is off, the third switch S3 is on, the fourth switch S4 is off, the fifth switch S5 is off, the sixth switch S6 is off, and the seventh switch S7 is on. In the third state Toff2, the first switch S1 is off, the second switch S2 is off, the third switch S3 is on, the fourth switch S4 is off, the fifth switch S5 is on, the sixth switch S6 is off, and the seventh switch S7 is off.

The controller 106 is configured for pulse width modulation (PWM) control of the switches S1-S7 from state to state (Ton to Toff1 to Toff2, back to Ton, and so forth, at PWM frequencies). The controller 106 is configured to receive input and to switch between the first, second, third, and fourth modes based on input (as indicated by the input arrow in FIG. 1). A method includes switching a single buck-boost circuit (e.g. system 100 as shown in FIG. 1) with a single voltage source input (e.g. voltage source input 102) from one of the modes from among the four modes described above, to a second one of the modes (e.g. switching from Mode 1 to Mode 2; or switching from Mode 3 to Mode 1, or the like).

As disclosed herein, the circuit can use a single inductor L1 to transfer power to two voltage outputs 108, 109, which share the power. It is also contemplated that it is possible to transfer all the system power to a single one of the voltage outputs 108, 109. In the scenario where non-inverting or inverting input is needed at the first voltage output 108, and zero voltage output is needed at the second voltage output 109, the controller 106 can keep switches S5 and S6 off for a full switching cycle and cycle the remaining switches S1-S4 and S7 between two states as Ton/Toff shown in FIG. 3. In FIG. 3, Mode 5 is for non-inverting buck-boost output on the first voltage outlet 108 (with zero voltage on the second voltage output 109 in FIG. 1) and Mode 6 is for inverting buck-boost output on the first voltage outlet 108 (with zero voltage on the second voltage output 109). Similarly, the controller can keep switches S7 and S4 off in a full switching cycle and can cycle the other switches S1-S3, and S5-S6 between two states Ton/Toff as shown in FIG. 3 for Modes 7 and 8. Mode 7 is for non-inverting buck-boost output on the second voltage output 109, with zero voltage output on the first voltage output 108, and Mode 8 is for inverting buck-boost output on the second voltage output 109, with zero voltage output on the first voltage output 108.

The methods and systems of the present disclosure, as described above and shown in the drawings, provide for providing positive voltage or negative voltage to each of first and second voltage outputs, as needed for any of four combinations of polarity among the first and second voltage outputs including positive-positive, positive-negative, negative-positive, and negative-negative. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A dual output buck-boost power converting system comprising:
   a voltage source input for connecting a voltage source for power conversion;
   a plurality of switches electrically connected to the voltage source input, wherein each switch is connected to a controller configured for pulse width modulation (PWM) control of the switches;
   a first voltage output configured to connect to a first load to power the first load with converted power from the voltage source input;
   a second voltage output configured to connect to a second load to power the second load with converted power from the voltage source input, wherein the controller is configured to provide positive voltage or negative voltage to each of the first and second voltage outputs, as needed for any of four combinations of polarity among the first and second voltage outputs including positive-positive, positive-negative, negative-positive, and negative-negative;
   a first line running from a positive node of the voltage source input to a first node of the first voltage output;
   a second line running from a negative node of the voltage source input to a second node of the first voltage output, wherein the first voltage output is configured to power a first load connected between the first and second nodes of the first voltage output;
   a third line connecting between the first line and a first node of the second voltage output, wherein the second voltage output includes a second node and is configured to power a second load connected between the first and second nodes of the second voltage output;
   an inductor connected in series along the first line;
   a capacitor connecting between the first and second lines;
   a second capacitor connected between the first and second nodes of the second voltage output;
   a first switch connected in series along the first line between the voltage source input and the inductor;
   a second switch connecting between the first line and the second line, wherein the second switch connects to the first line at the node between the first switch and the inductor;
   a third switch connecting between the first line and the second line, wherein the third switch connects to the first line at a node between the inductor and the first node of the first voltaic output;
   a fourth switch connected in series along the first line between the first node of the first voltage output and the third switch;
   a fifth switch connected in series along the third line between the first line and the first node of the second voltage output, wherein the fifth switch connects to the first line at the node between the first switch and the inductor;
   a sixth switch connecting between the first line and the first node of the second voltage output, wherein the sixth switch connects to the first line at the node between the inductor and the third switch; and
   a seventh switch connected in series along a fourth line that is in parallel with the first line, wherein the fourth line connects to the first line at a node between the first switch and the inductor, and at the first node of the first voltage output.

2. The system as recited in claim 1, wherein the controller includes machine readable instructions configured to cause the controller in a first mode to cycle the switches in order between a first state, a second state, and a third state, wherein in the first mode there is non-inverting output for the first voltage output and inverting output for the second voltage output,
   wherein in the first state the first switch is on, the second switch is off, the third switch is on, the fourth switch is off, the fifth switch is off, the sixth switch is off, and the seventh switch is off,
   wherein in the second state the first switch is off, the second switch is off, the third switch is on, the fourth switch is off, the fifth switch is on, the sixth switch is off, and the seventh switch is off, and
   wherein in the third state, the first switch is off, the second switch is on, the third switch is off, the fourth switch is on, the fifth switch is off, the sixth switch is off, and the seventh switch is off.

3. The system as recited in claim 1, wherein the controller includes machine readable instructions configured to cause the controller in a second mode to cycle the switches in order between a first state, a second state, and a third state, wherein in the second mode there is non-inverting output for the first voltage output and inverting output for the second voltage output,
   wherein in the first state the first switch is on, the second switch is off, the third switch is on, the fourth switch is off, the fifth switch is off, the sixth switch is off, and the seventh switch is off,
   wherein in the second state the first switch is off, the second switch is off, the third switch is on, the fourth switch is off, the fifth switch is off, the sixth switch is off, and the seventh switch is on, and
   wherein in the third state, the first switch is off, the second switch is on, the third switch is off, the fourth switch is off, the fifth switch is off, the sixth switch is on, and the seventh switch is off.

4. The system as recited in claim 1, wherein the controller includes machine readable instructions configured to cause the controller in a third mode to cycle the switches in order between a first state, a second state, and a third state, wherein in the third mode there is non-inverting output for the first voltage output and inverting output for the second voltage output,
   wherein in the first state the first switch is on, the second switch is off, the third switch is on, the fourth switch is off, the fifth switch is off, the sixth switch is off, and the seventh switch is off,
   wherein in the second state the first switch is off, the second switch is on, the third switch is off, the fourth switch is on, the fifth switch is off, the sixth switch is off, and the seventh switch is off, and
   wherein in the third state, the first switch is off, the second switch is on, the third switch is off, the fourth switch is off, the fifth switch is off, the sixth switch is on, and the seventh switch is off.

5. The system as recited in claim 1, wherein the controller includes machine readable instructions configured to cause the controller in a fourth mode to cycle the switches in order between a first state, a second state, and a third state, wherein in the fourth mode there is non-inverting output for the first voltage output and inverting output for the second voltage output,
   wherein in the first state the first switch is on, the second switch is off, the third switch is on, the fourth switch is off, the fifth switch is off, the sixth switch is off, and the seventh switch is off,
   wherein in the second state the first switch is off, the second switch is off, the third switch is on, the fourth switch is off, the fifth switch is off, the sixth switch is off, and the seventh switch is on, and wherein in the third state, the first switch is off, the second switch is off, the third switch is on, the fourth switch is off, the fifth switch is on, the sixth switch is off, and the seventh switch is off.

6. The system as recited in claim 1, wherein the controller is configured for pulse width modulation (PWM) control of the switches from state to state.

7. The system as recited in claim 1,
wherein the voltage source input has a polarity,
wherein in a first mode the first voltage output has the same polarity as the voltage source input and the second voltage output as a polarity opposite that of the voltage source input,
wherein in a second mode the first voltage output has a polarity opposite that of the voltage source input and the second voltage output has the same polarity as the first voltage source input,
wherein in a third mode the first and second voltage outputs have the same polarity as the voltage source input, and
wherein in a fourth mode the first and second voltage outputs have a polarity opposite that of the voltage source input.

8. The system as recited in claim 7, wherein the controller is configured to receive input and to switch between the first, second, third, and fourth modes based on input.

9. A method comprising:
switching a dual output buck-boost circuit with a single voltage source input having a polarity, between two modes from among the following four modes:
a first mode wherein a first voltage output has the same polarity as the voltage source input and a second voltage output as a polarity opposite that of the voltage source input,
a second mode wherein the first voltage output has a polarity opposite that of the voltage source input and the second voltage output has the same polarity as the first voltage source input,
a third mode wherein the first and second voltage outputs have the same polarity as the voltage source input, and
a fourth mode wherein the first and second voltage outputs have a polarity opposite that of the voltage source input;
wherein the dual output buck-boost circuit includes a first switch, a second switch, a third switch, a fourth switch, a fifth switch, a sixth switch, and a seventh switch wherein in each of the modes, the method includes pulse width modulation (PWM) control of the switches;
wherein in the first mode the method includes cycling the switches in order between a first state, a second slate, and a third slate,
wherein in the first state the first switch is on, the second switch is off, the third switch is on, the fourth switch is off, the fifth switch is off, the sixth switch is off, and the seventh switch is off,
wherein in the second state the first switch is off, the second switch is off, the third switch is on, the fourth switch is off, the fifth switch is on, the sixth switch is off, and the seventh switch is off, and
wherein in the third state, the first switch is off, the second switch is on, the third switch is off, the fourth switch is on, the fifth switch is off, the sixth switch is off, and the seventh switch is off;
wherein in the second mode the method includes cycling the switches in order between a first state, a second state, and a third state,
wherein in the first state the first switch is on, the second switch is off, the third switch is on, the fourth switch is off, the fifth switch is off, the sixth switch is off, and the seventh switch is off,
wherein in the second state the first switch is off, the second switch is off, the third switch is on, the fourth switch is off, the fifth switch is off, the sixth switch is off, and the seventh switch is on, and
wherein in the third state, the first switch is off, the second switch is on, the third switch is off, the fourth switch is off, the fifth switch is off, the sixth switch is on, and the seventh switch is off;
wherein in the third mode the method includes cycling the switches in order between a first state, a second state, and a third state,
wherein in the first state the first switch is on, the second switch is off, the third switch is on, the fourth switch is off, the fifth switch is off, the sixth switch is off, and the seventh switch is off,
wherein in the second state the first switch is off, the second switch is on, the third switch is off, the fourth switch is on, the fifth switch is off, the sixth switch is off, and the seventh switch is off, and
wherein in the third state, the first switch is off, the second switch is on, the third switch is off, the fourth switch is off, the fifth switch is off, the sixth switch is on, and the seventh switch is off; and
wherein in the fourth mode the method includes cycling the switches in order between a first state, a second state, and a third state,
wherein in the first state the first switch is on, the second switch is off, the third switch is on, the fourth switch is off, the fifth switch is off, the sixth switch is off, and the seventh switch is off,
wherein in the second state the first switch is off, the second switch is off, the third switch is on, the fourth switch is off, the fifth switch is off, the sixth switch is off, and the seventh switch is on, and
wherein in the third state, the first switch is off, the second switch is off, the third switch is on, the fourth switch is off, the fifth switch is on, the sixth switch is off, and the seventh switch is off.

\* \* \* \* \*